(12) United States Patent
Swoboda et al.

(10) Patent No.: US 10,508,436 B2
(45) Date of Patent: *Dec. 17, 2019

(54) THERMALLY INSULATING COMPOSITION FOR ORGANIC MONOLITHIC GEL, USE THEREOF AND PROCESS FOR PREPARING SAME

(71) Applicant: Hutchinson, Paris (FR)

(72) Inventors: Benjamin Swoboda, Bois le Roi (FR); Bruno Dufour, Champagne sur Seine (FR); Philippe Sonntag, Avon (FR); Christophe Dominiak, Varennes-Changy (FR)

(73) Assignee: Hutchinson, Paris (FR)

( * ) Notice: Subject to any disclaimer, the term of this patent is extended or adjusted under 35 U.S.C. 154(b) by 68 days.

This patent is subject to a terminal disclaimer.

(21) Appl. No.: 14/435,617

(22) PCT Filed: Oct. 8, 2013

(86) PCT No.: PCT/IB2013/059208
§ 371 (c)(1),
(2) Date: Apr. 14, 2015

(87) PCT Pub. No.: WO2014/060906
PCT Pub. Date: Apr. 24, 2014

(65) Prior Publication Data
US 2015/0267400 A1 Sep. 24, 2015

(30) Foreign Application Priority Data

Oct. 17, 2012 (FR) ..................... 12 59895

(51) Int. Cl.
| | | |
|---|---|---|
| *E04B 1/00* | (2006.01) | |
| *E04B 1/76* | (2006.01) | |
| *C08J 3/075* | (2006.01) | |
| *C08J 9/28* | (2006.01) | |
| *C01B 32/05* | (2017.01) | |
| *E04B 1/74* | (2006.01) | |

(52) U.S. Cl.
CPC ............... *E04B 1/76* (2013.01); *C01B 32/05* (2017.08); *C08J 3/075* (2013.01); *C08J 9/28* (2013.01); *C08J 2201/0484* (2013.01); *C08J 2201/0504* (2013.01); *C08J 2205/026* (2013.01); *C08J 2205/028* (2013.01); *C08J 2205/042* (2013.01); *C08J 2361/12* (2013.01); *E04B 2001/742* (2013.01)

(58) Field of Classification Search
CPC ........................................................ E04B 1/76
See application file for complete search history.

(56) References Cited

U.S. PATENT DOCUMENTS

| | | | | | |
|---|---|---|---|---|---|
| 3,775,158 | A | * | 11/1973 | Gallagher | ............... C08G 18/58 156/307.5 |
| 4,873,218 | A | * | 10/1989 | Pekala | ..................... B01J 20/20 502/418 |
| 5,744,510 | A | | 4/1998 | Pekala | |
| 5,877,100 | A | * | 3/1999 | Smith | ...................... B01J 13/00 252/62 |
| 6,297,293 | B1 | * | 10/2001 | Bell | ........................ B01J 20/20 423/445 R |
| 7,167,354 | B2 | * | 1/2007 | Dietz | ...................... B01J 20/20 361/502 |
| 2008/0103227 | A1 | * | 5/2008 | Yun | ....................... B29C 64/106 523/105 |
| 2009/0036557 | A1 | | 2/2009 | Ratke et al. | |
| 2010/0288160 | A1 | | 11/2010 | Maisels et al. | |
| 2011/0278755 | A1 | * | 11/2011 | Liu | ......................... A61L 27/16 264/41 |
| 2015/0299508 | A1 | * | 10/2015 | Dufour | ................... C01B 31/02 361/502 |

FOREIGN PATENT DOCUMENTS

| | | |
|---|---|---|
| EP | 2 080 736 A1 | 7/2009 |
| WO | WO 2005/056643 A2 | 6/2005 |

OTHER PUBLICATIONS

Bruno et al, Functional Materials Letters, v2, No. 3, 2009, 135-138.*
Balach et al, Colloids and Surfaces A: Physicochem. Eng. Aspects, 415 (2012) 343-348.*
International Search Report and Written Opinion for Application No. PCT/IB2013/059208 dated Feb. 25, 2014.
Aegerter, M. A. et al., *Aerogel Handbook*, Advances in Sol-Gel Derived Materials and Technologies, Chapter 22.
Bruno, M. M. et al., *A Novel Way to Maintain Resorcinol-Formaldehyde Porosity During Drying: Stabilization of the Sol-Gel Nanostructure Using a Cationic Polyelectrolyte*, Colloids and Surfaces A: Physicochemical and Engineering Aspects, 362 (2010) 28-32.
Pekala, R. W. et al., *New Organic Aerogels Based Upon a Phenolic-Furfural Reaction*, Journal of Non-Crystalline Solids, 188 (1995) 34-40.

* cited by examiner

*Primary Examiner* — Irina Krylova
(74) *Attorney, Agent, or Firm* — Alston & Bird LLP

(57) ABSTRACT

Provided is a gelled carbon-based composition forming an organic polymeric monolithic gel capable of forming a porous carbon monolith by pyrolysis, a use thereof and a process for preparing this composition. A composition according to the invention is based on a resin derived at least partly from polyhydroxybenzene(s) R and formaldehyde(s) F, has a thermal conductivity of less than or equal to 40 mW·m$^{-1}$·K$^{-1}$, and includes at least one water-soluble cationic polyelectrolyte P. A process for preparing this composition comprises: a) polymerization, in an aqueous solvent, of the polyhydroxybenzene(s) and formaldehyde(s), in the presence of at least one cationic polyelectrolyte dissolved in this solvent and of a catalyst, in order to obtain a solution based on the resin, b) gelling of the solution in order to obtain a gel, and c) drying in order to obtain the organic polymeric monolithic gel.

13 Claims, No Drawings

THERMALLY INSULATING COMPOSITION FOR ORGANIC MONOLITHIC GEL, USE THEREOF AND PROCESS FOR PREPARING SAME

FIELD

The present invention relates to a gelled carbon-based composition forming an organic polymeric monolithic gel capable of forming a porous carbon monolith by pyrolysis, to the use of this composition, and to a process for preparing this carbon-based composition. The invention applies in particular to the obtaining of such organic gels, such as aerogels, or of such carbon monoliths having a very low density, a high specific surface area and a high pore volume, for use thereof as thermal superinsulator materials (i.e. typically having a thermal conductivity of less than or equal to approximately 40 mW·m$^{-1}$·K$^{-1}$).

BACKGROUND

Aerogels are porous materials obtained after gelling and then drying of the gel, in which the liquid acting as solvent has been replaced with a gas or gas mixture. At very low density (or at high pore volume) these materials are very promising for uses as thermal insulators. This is because their nanoporosity makes it possible to limit the effects of convection of the air contained in the pores.

The preparation of very low density aerogels is, however, complicated because of their limited mechanical properties, which to date do not allow conventional oven-drying, in particular because of the vaporization of the solvent during this oven-drying, which gives rise to internal stresses in the material, destroying its nanostructure and creating macrofissures therein. This is why drying with supercritical $CO_2$ is conventionally used for the production of these low-density aerogels. This method gives good results regarding the stability of the nanostructure, but it has the drawback of penalizing the manufacturing cost of the aerogel.

Silica aerogels, which are the ones that have been most widely studied for applications as thermal superinsulators (these aerogels may have thermal conductivities of about 0.015 to 0.020 W·m$^{-1}$·K$^{-1}$), do not escape these findings. Thus, with conventional oven-drying, these silica gels undergo substantial densification and a loss of their nanostructure. Furthermore, the fissuring of these gels creates fines, which poses toxicity problems due to the release by the powder of silica nanoparticles. Research efforts have thus been concentrated on the spring-back effect of silica aerogels after modification of the chemical nature of their surface, and on replacement of the silanol groups with unreactive groups making it possible to render the densification reversible after evaporative drying.

This principle has allowed the industrial production of low-density silica powder in the form of a thermal superinsulating nanostructured aerogel, but has not allowed the synthesis of stable monolithic material, in contrast with organic aerogels of high specific surface area, which are, themselves also, promising for uses as thermal superinsulators.

In a known manner, these organic aerogels are typically prepared from a resorcinol-formaldehyde (RF) resin, which has the advantage of being inexpensive and of being able to give a gel used in water and of being able to have various porosity values and density values depending on the preparation conditions (according to the ratios between reagents R and F and the catalyst, for example). Furthermore, these organic aerogels can be pyrolyzed in the form of carbon with a high specific surface area having the advantage of absorbing infrared radiation, and thus of having a low thermal conductivity at high temperature. On the other hand, these chemical gels obtained by polycondensation of precursors are irreversible and therefore cannot be reused. Furthermore, at high conversion, these gels become hydrophobic and precipitate out, which induces mechanical stresses in these materials and increases their fragility.

As for silica aerogels, it is thus necessary, in order to obtain very low density organic monolithic aerogels, to use a drying technique that is mild enough to avoid fracturing or contraction of the nanostructure and a loss of specific surface area for these aerogels. This drying is conventionally carried out via solvent exchange with an alcohol, and then via drying by means of supercritical $CO_2$.

Mention may be made, for example, of document U.S. Pat. No. 4,997,804 for the description of a process for manufacturing such an organic monolithic aerogel based on resorcinol-formaldehyde resin, which uses this drying by solvent exchange and then by supercritical fluid.

As previously indicated, a major drawback of this drying technique is that it is complex to perform and very expensive.

SUMMARY

One aim of the present invention is to provide a gelled carbon-based composition forming an organic polymeric monolithic gel capable of forming by pyrolysis a thermal superinsulating porous carbon monolith (i.e. with a thermal conductivity of less than or equal to 40 mW·m$^{-1}$·K$^{-1}$) which makes it possible to overcome all of the abovementioned drawbacks.

This aim is achieved in that the applicant has discovered, surprisingly, that the addition in aqueous phase, to precursors of a resin of polyhydroxybenzene and formaldehyde type, of a particular family of additives consisting of a water-soluble cationic polyelectrolyte, makes it possible to obtain a monolithic gel or the pyrolyzate thereof which simultaneously has a high specific surface area, a very low density and a high pore volume, while being able to dispense with drying by solvent exchange and by supercritical fluid.

To this effect, a carbon-based composition according to the invention which is based on a resin derived at least partly from polyhydroxybenzene(s) R and formaldehyde(s) F is such that it comprises at least one water-soluble cationic polyelectrolyte P.

It will be noted that this composition of the invention incorporating this cationic polyelectrolyte can be advantageously obtained by using oven drying, which is much simpler to perform and less penalizing on the production cost of the gel than drying with supercritical $CO_2$. Indeed, the applicant has discovered that this additive makes it possible to preserve the high porosity of the gel obtained following this oven drying and to confer thereon a very low density allied to a high specific surface area and a high pore volume.

DETAILED DESCRIPTION

The term "gel" is intended to mean, in a known manner, the mixture of a colloidal material and of a liquid, which forms spontaneously or under the action of a catalyst by flocculation and coagulation of a colloidal solution.

The term "water-soluble polymer" is intended to mean a polymer which can be dissolved in water without the addition of additives (in particular surfactants), unlike a water-dispersible polymer which is capable of forming a dispersion when it is mixed with water.

According to another characteristic of the invention, said carbon-based composition comprises the product of a reaction for polymerization, in an aqueous solvent W of said polyhydroxybenzene(s) R and formaldehyde(s) F, in the presence of said at least one cationic polyelectrolyte P dissolved in this solvent and of an acid or basic catalyst.

Advantageously, said product of the polymerization reaction may comprise:
said at least one cationic polyelectrolyte P in a very low mass fraction which is between 0.2% and 2% and preferably between 0.3% and 1%, and/or
said at least one cationic polyelectrolyte P in a P/(R+F) mass ratio with respect to said polyhydroxy-benzene(s) R and formaldehyde(s) F, which is between 2% and 10% and preferably between 3% and 7%, and/or
said at least one cationic polyelectrolyte P in a P/(R+F+W) mass ratio with respect to said polyhydroxy-benzene(s) R, formaldehyde(s) F and aqueous solvent W, which is between 0.3% and 2% and preferably between 0.4% and 1.5%.

Said at least one polyelectrolyte may be any cationic polyelectrolyte which is totally soluble in water and has a low ionic strength.

Preferably, it is an organic polymer chosen from the group consisting of quaternary ammonium salts, poly(vinylpyridinium chloride), poly(ethyleneimine), poly(vinylpyridine), poly(allylamine hydrochloride), poly(trimethylammoniumethylmethacrylate chloride), poly(acrylamide-co-dimethylammonium chloride) and mixtures thereof.

Even more preferentially, said at least one water-soluble cationic polyelectrolyte P is a salt comprising units derived from a quaternary ammonium chosen from poly(diallyldimethylammonium halide) and is preferably poly(diallyldimethylammonium chloride) or poly(diallyldimethylammonium bromide).

Among the precursor polymers of said resin which are usable in the present invention, mention may be made of polymers resulting from the polycondensation of at least one monomer of the polyhydroxybenzene type and of at least one formaldehyde monomer. This polymerization reaction may involve more than two distinct monomers, the additional monomers optionally being of the polyhydroxybenzene type. The polyhydroxybenzenes that are usable are preferentially di- or tri-hydroxybenzenes, and advantageously resorcinol (1,3-dihydroxybenzene) or a mixture of resorcinol with another compound chosen from catechol, hydroquinone and phloroglucinol.

Use may, for example, be made of the polyhydroxybenzene(s) R and formaldehyde(s) F according to an R/F molar ratio of between 0.3 and 0.7.

According to another characteristic of the invention, said carbon-based composition may advantageously have a specific surface area of between 400 $m^2/g$ and 1200 $m^2/g$, and/or a pore volume of between 0.1 $cm^3/g$ and 3 $cm^3/g$, and/or an average pore diameter of between 3 nm and 30 nm, and/or a density of between 0.04 and 0.4.

An organic polymeric monolithic gel according to the invention, such as an aerogel, consists of a carbon-based composition as defined above.

Advantageously, this gel and the carbon monolith obtained via its pyrolysis may have a thermal conductivity of between 10 $mW \cdot m^{-1} \cdot K^{-1}$ and 40 $mW \cdot m^{-1} \cdot K^{-1}$ and for example of between 20 and 35 $mW \cdot m^{-1} \cdot K^{-1}$, this gel being usable for thermal insulation of a building.

A process according to the invention for preparing a carbon-based composition as defined above comprises:
a) polymerization, in an aqueous solvent W, of said polyhydroxybenzene(s) R and formaldehyde(s) F, in the presence of said at least one cationic polyelectrolyte P dissolved in this solvent and of a catalyst, in order to obtain a solution based on said resin,
b) gelling of the solution obtained in a) in order to obtain a gel of said resin, and
c) drying of the gel obtained in b) in order to obtain said organic polymeric monolithic gel.

In order to obtain the porous carbon monolith, the dried gel obtained in c) is subjected to pyrolysis.

Advantageously and as indicated above, step a) may be carried out using said at least one polyelectrolyte P in a mass fraction in the composition of between 0.2% and 2%, and/or in a P/(R+F) mass ratio of between 2% and 10%, and/or in a P/(R+F+W) mass ratio of between 0.3% and 2%.

Likewise advantageously, it is possible to carry out:
step a) at ambient temperature, by dissolving said polyhydroxybenzene(s) R and said at least one cationic polyelectrolyte P in said aqueous solvent, preferably consisting of water, and then by adding, to the solution obtained, said formaldehyde(s) F and said catalyst which may be acidic or basic, then
step b) by curing said solution in an oven.

By way of catalyst usable in step a), mention may, for example, be made of acidic catalysts, such as aqueous solutions of hydrochloric acid, sulfuric acid, nitric acid, acetic acid, phosphoric acid, trifluoroacetic acid, trifluoromethanesulfonic acid, perchloric acid, oxalic acid, toluenesulfonic acid, dichloroacetic acid or formic acid, or else basic catalysts such as sodium carbonate, sodium hydrogen carbonate, potassium carbonate, ammonium carbonate, lithium carbonate, aqueous ammonia, potassium hydroxide and sodium hydroxide.

Use may, for example, be made, in step a), of an R/W mass ratio between polyhydroxybenzene(s) and water of between 0.001 and 0.07.

Preferably, step c) is carried out by drying in humid air, for example in an oven, without solvent exchange or drying with supercritical fluid, in order to obtain said organic polymeric monolithic gel which has (according to the synthesis conditions and in particular the pH) a specific surface area of between 400 $m^2/g$ and 1200 $m^2/g$, and/or a pore volume of between 0.1 $cm^3/g$ and 3 $cm^3/g$, and/or an average pore diameter of between 3 nm and 30 nm, and/or a density of between 0.04 and 0.4.

It will be noted that this aqueous-phase preparation process according to the invention thus makes it possible to obtain controlled porous structures which vary according to the synthesis conditions. It is thus possible to obtain a structure of low density that is solely nanoporous (i.e. with a pore diameter of less than 50 nm), or alternatively with a coexistence between nanopores and macropores (i.e. with a pore diameter of greater than 50 nm).

Other characteristics, advantages and details of the present invention will emerge on reading the following description of several implementation examples of the invention, given by way of nonlimiting illustration.

EXAMPLES OF PREPARATION ACCORDING TO THE INVENTION

The examples which follow illustrate the preparation of two "control" organic monolithic gels G0 and G0', of five organic monolithic gels according to the invention G1 to G5 and of the corresponding "control" porous carbons C0 and C0' and porous carbons according to the invention C1 to C5, with, as starting reagents:

resorcinol (R) from Acros Organics, 98% pure,
formaldehyde (F) from Acros Organics, 37% pure,
a catalyst (C) consisting of hydrochloric acid for the gels G1 to G4 and of sodium carbonate for the gel G5, and
poly(diallyldimethylammonium chloride) (P), 35% pure (in solution in water W), for the gels G1 to G5.

These gels G0, G0' and G1 to G5 were prepared as follows.

The resorcinol R and the polyelectrolyte P (with the exception of the gels G0 and G0') were, in a first step, dissolved in a container containing water. Then, after total dissolution, the formaldehyde F was added. The polymeric solution obtained was adjusted to the appropriate pH with the catalyst C, it being specified that all of these operations were carried out at ambient temperature (at approximately 22° C.). In a second step, the solution obtained was transferred into Teflon® molds, which were then placed in an oven at 90° C. for 24 h in order to perform the gelation.

The gel was then dried:
in a humid chamber at 85° C. with a degree of humidity of 90% for 17 hours, so as to obtain the gels G0', G2, G4 and G5, or
using supercritical $CO_2$ after solvent exchange in a trifluoroacetic acid bath for 3 days and then in an absolute ethanol bath for 4 days, so as to obtain the aerogels G0, G1 and G3.

Finally, the organic gels G0, G0' and G1 to G5 were pyrolyzed under nitrogen at a temperature of 800° C., in order to obtain the porous monolithic carbons C0, C0' and C1 to C5.

In table 1 hereinafter:
R/F is the molar ratio between resorcinol and formaldehyde,
R/W is the mass ratio between resorcinol and water,
denotes the mass fraction of polyelectrolyte,
P/(R+F) is the mass ratio between the polyelectrolyte and the resorcinol-formaldehyde precursors,
P/(R+F+W) is the mass ratio between the polyelectrolyte and the resorcinol-formaldehyde precursors supplemented with water, and
$CO_2$ sc denotes drying using supercritical $CO_2$, as opposed to the oven-drying usable according to the invention.

The thermal conductivity of the gels G0, G2 and G4 (see table 2) and of the porous carbons C0, C2 and C4 (see table 3) was measured at 22° C. with a Neotim conductivity meter according to the hot wire technique, and the mechanical properties in three-point compression and in tension of the gel G4 and of the corresponding porous carbon C4 were measured in comparison with those of a "control" silica aerogel G0" (see table 4) with an MTS tensile/compression testing machine according to standard ASTM C165-07.

For each porous carbon C0, C0' and C1 to C5, the specific surface areas, the pore volumes and the average pore diameters were measured (table 2) using the Tristar 3020 instrument from Micromeritics.

TABLE 1

| Amounts of reagents/ process | G0 | G0' | G1 | G2 | G3 | G4 | G5 |
|---|---|---|---|---|---|---|---|
| R/F | 0.5 | 0.5 | 0.5 | 0.5 | 0.5 | 0.5 | 0.5 |
| R/W | 0.03 | 0.03 | 0.03 | 0.03 | 0.03 | 0.03 | 0.20 |
| P | 0 | 0 | 0.4% | 0.4% | 0.4% | 0.4% | — |
| P/(R + F) | 0 | 0 | 0.0626 | 0.0626 | 0.0640 | 0.0640 | 0.0379 |
| P/(R + F + W) | 0 | 0 | 0.0044 | 0.0044 | 0.0070 | 0.0070 | 0.0127 |
| pH | 3 | 3 | 3 | 3 | 1 | 1 | 6.13 |
| Drying method | $CO_2$ sc | Oven | $CO_2$ sc | Oven | $CO_2$ sc | Oven | Oven |

TABLE 2

| Organic gel | G0 | G0' | G1 | G2 | G3 | G4 | G5 |
|---|---|---|---|---|---|---|---|
| Density of the gel | 0.40 | 1 | 0.20 | 0.40 | 0.04 | 0.04 | 0.20 |
| Thermal conductivity of the gel (mW/mK) | 24 | — | — | 26 | — | 24 | — |

TABLE 3

| Porous carbon | C0 | C0' | C1 | C2 | C3 | C4 | C5 |
|---|---|---|---|---|---|---|---|
| Specific surface area of the carbon ($m^2/g$) | 983 | 18 | 1014 | 1080 | 769 | 1170 | 670 |
| Pore volume ($cm^3/g$) of the carbon | 0.58 | 0.012 | 0.87 | 0.95 | 0.32 | 0.47 | 0.26 |
| Average pore diameter (nm) of the carbon | 3.6 | — | 10 | 10 | 5.4 | 4.1 | 3.9 |
| Density of the carbon | 0.40 | 0.90 | 0.20 | 0.40 | 0.04 | 0.06 | 0.20 |
| Thermal conductivity (mW/mK) of the carbon | 30 | — | — | 33 | — | 29 | — |

The comparison of the "control" porous carbons C0 and C0' with those of the invention C1 to C5 clearly shows that the addition of the cationic polyelectrolyte P makes it possible to maintain, for a low density obtained, a nanometric structure even with oven drying (see the specific surface area, pore volume and average pore diameter values of the porous carbons C2, C4 and C5 which are of the same order as those of C0), whereas, without this polyelectrolyte, the use of drying with supercritical $CO_2$ is necessary in order to retain this nanostructure of the porous carbon C0.

Under these conditions, the densities of the nanostructured gels G1 to G5 and carbons C1 to C5 according to the invention are always less than or equal to 0.4.

If the pH is adjusted to 1, these results also show that it is possible to obtain a monolithic material (see gels G3 and G4 and carbons C3 and C4 of the invention) with much lower densities (less than or equal to 0.06).

Finally, the results obtained for the gel G5 and the corresponding carbon C5 of the invention show that the synthesis can also be carried out in a less acidic and even slightly basic medium (pH>6).

TABLE 4

| Structure of the gel or of the carbon | Silica aerogel* G0" | Gel G4 | Porous carbon C4 |
|---|---|---|---|
| Density | 0.1* | 0.04 | 0.06 |
| Compression modulus (MPa) | 55* | 800 | 1050 |
| Breaking strength (MPa) | 4* | 25 | 20 |

*according to M. A. Aegerter et al., "Aerogel Handbook" Advances in Sol-Gel Derived Materials and Technologies, chap. 22.

This table 4 shows that the gels and porous carbons according to the invention have mechanical properties which are very markedly improved in comparison with those of a known silica aerogel.

The invention claimed is:

1. A gelled carbon-based composition for forming an organic polymeric monolithic aerogel capable of forming a porous carbon monolith by pyrolysis, the composition being based on a resin derived from polyhydroxybenzene(s) R and formaldehyde(s) F,
wherein said gelled composition comprises at least one water-soluble cationic polyelectrolyte P, said gelled composition comprising the product of a polymerization reaction, in an aqueous solvent W, only of said polyhydroxybenzene(s) R and said formaldehyde(s) F, in the presence of said at least one cationic polyelectrolyte P dissolved in said solvent and of a catalyst,
wherein said gelled composition has:
a pore volume of between 0.1 $cm^3/g$ and 3 $cm^3/g$,
a density of between 0.04 and 0.06,
a thermal conductivity from 10 to 35 $mW \cdot m^{-1} \cdot K^{-1}$, measured at 22° C. with a Neotim conductivity meter according to the hot wire technique, and
at least one of a compression modulus of 800 MPa and a breaking strength of 25 MPa, measured in three-point compression and in tension with a MTS tensile/compression testing machine according to standard ASTM C165-07,
and
wherein the product of the polymerization reaction comprises said at least one cationic polyelectrolyte P in a mass fraction of between 0.2% and 2%.

2. The gelled carbon-based composition as claimed in claim 1, wherein said product of the polymerization reaction comprises said at least one cationic polyelectrolyte P in a mass fraction of between 0.3% and 1%.

3. The gelled carbon-based composition as claimed in claim 1, wherein said product of the polymerization reaction comprises said at least one cationic polyelectrolyte P in a P/(R+F+W) mass ratio with respect to said polyhydroxybenzene(s) R, formaldehyde(s) F and aqueous solvent W, which is between 0.3% and 2%.

4. The gelled carbon-based composition as claimed in claim 1, wherein said at least one water-soluble cationic polyelectrolyte P is an organic polymer chosen from the group consisting of quaternary ammonium salts, poly(vinylpyridinium chloride), poly(ethyleneimine), poly(vinylpyridine), poly(allylamine hydrochloride), poly(trimethylammonium ethylmethacrylate chloride), poly(acrylamide-co-dimethylammonium chloride) and mixtures thereof.

5. The gelled carbon-based composition as claimed in claim 4, wherein said at least one water-soluble cationic polyelectrolyte is a salt comprising units derived from a quaternary ammonium chosen from poly(diallyldimethylammonium halide).

6. The gelled carbon-based composition as claimed in claim 5, wherein said at least one water-soluble cationic polyelectrolyte is a poly(diallyldimethylammonium chloride) or poly(diallyldimethylammonium bromide).

7. The gelled carbon-based composition as claimed in claim 1, wherein said composition has:
a specific surface area of between 400 $m^2/g$ and 1200 $m^2/g$, and/or
an average pore diameter of between 3 nm and 30 nm.

8. A process for preparing an organic polymeric monolithic aerogel, wherein said process comprises:
preparing the gelled carbon-based composition as claimed in claim 1, wherein preparing the gelled carbon-based composition comprises:
a) polymerization, in an aqueous solvent W, of said polyhydroxybenzene(s) R and said formaldehyde(s) F, in the presence of said at least one cationic polyelectrolyte P dissolved in said solvent and of said catalyst, in order to obtain a solution based on said resin, and
b) gelling of the solution obtained in a) in order to obtain a gel of said resin, and
drying of the gel obtained in b) in order to obtain said organic polymeric monolithic aerogel.

9. The preparation process as claimed in claim 8, wherein the step a) is carried out by using said at least one cationic polyelectrolyte P:
in a mass fraction in the composition of between 0.2% and 2%, and/or
in a P/(R+F) mass ratio with respect to said polyhydroxybenzene(s) R and said formaldehyde(s) F, of between 2% and 10%, and/or
in a P/(R+F+W) mass ratio with respect to said polyhydroxybenzene(s) R, said formaldehyde(s) F and said aqueous solvent W, of between 0.3% and 2%.

10. The preparation process as claimed in claim 8, wherein:
the step a) is carried out at ambient temperature, by dissolving said polyhydroxybenzene(s) R and said at least one cationic polyelectrolyte P in said aqueous solvent, and then by adding, to the solution obtained, said formaldehyde(s) F and said acidic or basic catalyst, then
the step b) is carried out by curing said solution in an oven.

11. The preparation process as claimed in claim 8, wherein the step of drying the gel is carried out by drying with humid air, without solvent exchange or drying with supercritical fluid, in order to obtain said organic polymeric monolithic gel which has:
a specific surface area of between 400 $m^2/g$ and 1200 $m^2/g$, and/or
an average pore diameter of between 3 nm and 30 nm.

12. The preparation process as claimed in claim 8, wherein the pH of the solution obtained in the step a) is adjusted to 1 with the catalyst which is acidic, so that the density of the organic polymeric monolithic aerogel is of between 0.04 and 0.06.

13. A method of insulating a building comprising a step of installing the composition as claimed in claim 1 in a building as a thermal insulation.

\* \* \* \* \*